US012779803B2

(12) United States Patent
Pontone

(10) Patent No.: US 12,779,803 B2
(45) Date of Patent: Nov. 3, 2026

(54) APPLICATION SYSTEM AND METHOD FOR APPLYING A SEALING AGENT TO THE INNER SURFACE OF A PNEUMATIC TIRE

(71) Applicant: Bridgestone Europe NV/SA [BE/BE], Zaventem (BE)

(72) Inventor: Roberto Pontone, Rome (IT)

(73) Assignee: Bridgestone Europe NV/SA, Zaventem (BE)

(*) Notice: Subject to any disclaimer, the term of this patent is extended or adjusted under 35 U.S.C. 154(b) by 606 days.

(21) Appl. No.: 17/413,325

(22) PCT Filed: Jan. 22, 2020

(86) PCT No.: PCT/IB2020/050484
§ 371 (c)(1),
(2) Date: Jun. 11, 2021

(87) PCT Pub. No.: WO2020/152593
PCT Pub. Date: Jul. 30, 2020

(65) Prior Publication Data
US 2022/0016858 A1 Jan. 20, 2022

(30) Foreign Application Priority Data
Jan. 25, 2019 (IT) ........................ 102019000001147

(51) Int. Cl.
*B29D 30/06* (2006.01)

(52) U.S. Cl.
CPC .. *B29D 30/0685* (2013.01); *B29D 2030/0694* (2013.01)

(58) Field of Classification Search
CPC ................ B29D 30/06; B29D 30/0685; B29D 2030/0694; B60C 19/12; B29C 48/18
See application file for complete search history.

(56) References Cited

U.S. PATENT DOCUMENTS

| | | | | |
|---|---|---|---|---|
| 4,359,354 | A | 11/1982 | Boehm | |
| 2003/0150544 | A1 | 8/2003 | Naito | |
| 2013/0087259 | A1 | 4/2013 | Mancini | |
| 2017/0291379 | A1* | 10/2017 | Yukawa | B29D 30/0685 |
| 2020/0198205 | A1* | 6/2020 | Chen | B29C 48/18 |

OTHER PUBLICATIONS

International Searching Authority: International search report dated Apr. 28, 2020 for corresponding International Patent Application No. PCT/IB2020/050484, 3 pages.

* cited by examiner

*Primary Examiner* — Alison L Hindenlang
*Assistant Examiner* — Shibin Liang
(74) *Attorney, Agent, or Firm* — Patterson Intellectual Property Law, PC

(57) ABSTRACT

An application system and method for applying a sealing agent to the inner surface of a pneumatic tire comprises: a support device operable for rotating the pneumatic tire around an axis of rotation; a dispensing head operable to be arranged inside the pneumatic tire in order to apply a layer of sealing agent to the inner surface of the pneumatic tire itself; a main extrusion device which is connected to the dispensing head and that is operable for supplying the dispensing head with a first throughput of sealing agent; and an additional extrusion device which is connected to the dispensing head, and which is separate and independent from the main extrusion device, and is operable for supplying the dispensing head itself with a second throughput of sealing agent that merges with the first throughput of sealing agent.

9 Claims, 4 Drawing Sheets

APPLICATION SYSTEM AND METHOD FOR APPLYING A SEALING AGENT TO THE INNER SURFACE OF A PNEUMATIC TIRE

TECHNICAL SECTOR

The present invention relates to an application system and method for applying a sealing agent to the inner surface of a pneumatic tire.

PRIOR ART

In recent years pneumatic tire development has been directed towards pneumatic tires with an inner lining that is manufactured with a sealing agent that is intended to seal any punctures. Normally, the sealing agent has a high viscosity in order to ensure both a sealing action in relation to any holes and its stability within the inner cavity regardless of the conditions of the pneumatic tire.

The sealing agent is applied to a pre-vulcanized pneumatic tire in the area of the pneumatic tire that comes into contact with the road (i.e. the area of the pneumatic tire wherein punctures can potentially occur). In particular, the sealing agent is applied at the tread and partially at the sidewalls.

In a known sealing agent application system, such as that described, for example, in the patent applications EP0080968A1 and JP2014217953A1 or else in the patent U.S. Pat. No. 4,398,492A1, a sealing agent applicator device is inserted into the already vulcanized pneumatic tire; the applicator device comprises an arm which is movable axially and supports at one end a dispensing head wherefrom a strip of sealing agent emerges. The pneumatic tire is rotated upon itself (typically by means of the motorized rollers whereupon the pneumatic tire rests) and the dispensing head carried by the arm is moved axially from one side of the pneumatic tire to the opposite side of the pneumatic tire in order to deposit upon the inner surface a spiral of sealing agent that covers the inner surface itself (i.e., the application of the sealing agent has a helical progression).

It has been observed that to control the dispensing of the sealing agent, the rotation of the pneumatic tire, and the continuous axial displacement of the dispensing head such as to obtain the constant annular overlapping of the strip of sealing agent which is wound helically in a coordinated manner is complicated; in other words, in applying a single continuous strip (i.e., seamless) of sealing agent having a helical shape, irregularities can form that have a circumferential progression at the overlapping areas of the strip of sealing agent.

To increase the uniformity of the strip of sealing agent deposited upon the inner surface of the pneumatic tire, it has been proposed not to apply a single continuous strip (i.e., seamless) of sealing agent having a helical shape, but to apply a plurality of circular strips of sealing agent that are independent of each other and arranged side by side; in other words, the dispensing head is not moved axially and continuously during the dispensing of the sealing agent and instead the dispensing head is held stationary during the dispensing of the sealing agent and is moved axially only between the end of the application of a strip of sealing agent and the start of the application of the next and adjacent strip of sealing agent.

However, it has been observed that known sealant agent application devices have non-negligible dispensing inertia, and, therefore, at the beginning of the dispensing, a relatively long period of time is required (approximately 0.8-1.2 seconds) in order to obtain from zero a nominal flow rate, and, similarly, at the end of the dispensing a relatively long period of time is required (approximately 0.4-0.6 seconds) in order to reduce the flow rate to zero. In other words, due to the characteristics of the sealing agent and the characteristics of the extruder device used, every time the extrusion is started and stopped a significant change in the flow rate of the sealing agent occurs, due to the inertia of the extrusion process, with the subsequently less controlled application of the sealing agent in terms of thickness, uniformity and the area covered. High dispensing inertia inevitably involves the formation of irregular thicknesses (i.e., the formation of non-uniformities) within the "closure" areas of the strips of sealing agent (i.e., within those areas wherein the end of the strip of sealing agent overlaps the beginning of the strip of sealing agent in order to complete the same circular strip of sealing agent).

Consequently, in applying a plurality of circular strips of a sealing agent that are independent of each other and arranged side by side, irregularities can form having an axial progression at the "closure" areas of the strips of sealing agent.

DESCRIPTION OF THE INVENTION

The object of the present invention is to provide an application system and method for applying a sealing agent to the inner surface of a pneumatic tire, which application system and method are free of the drawbacks described above and that, in particular, are of easy and economical manufacture.

According to the present invention an application system and method for applying a sealing agent to the inner surface of a pneumatic tire are provided, according to what is set forth in the attached claims.

The claims describe preferred embodiments of the present invention forming an integral part of the present description.

BRIEF DESCRIPTION OF THE DRAWINGS

The present invention will now be described with reference to the attached drawings, illustrating, but not limited to, an exemplary embodiment, wherein.

PREFERRED EMBODIMENTS OF THE INVENTION

Figure 1:
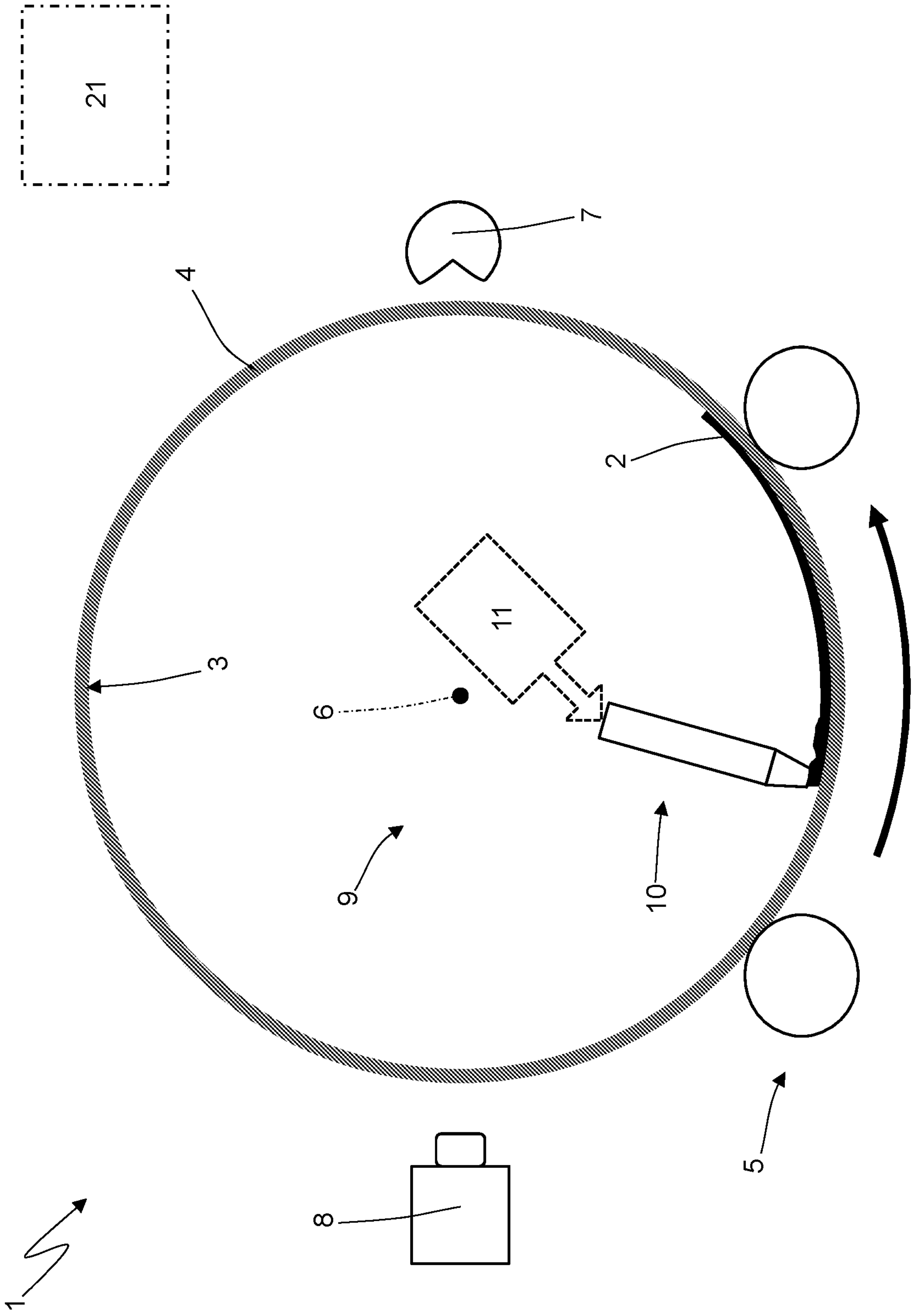
FIG. 1 is a schematic side view, with parts removed for clarity, of an application system manufactured in accordance with the present invention.

In FIG. 1, the numeral 1 denotes, in the entirety thereof, an application system 1 for the application of a sealing agent 2 to (at least) part of the inner surface 3 of a pneumatic tire 4. In other words, the pneumatic tire 4 has a toroidal shape bounded by an outer surface and by the inner surface 3 opposite the outer surface and the sealing agent 2 is applied to (at least) part of the inner surface 3; generally, the sealing agent 2 is applied to the inner surface 3 arranged at the tread and to part of the inner surface 3 arranged at the lateral parts (i.e., within those areas where punctures may normally occur).

The application system 1 comprises a support device 5 which is suitable for supporting the pneumatic tire 4 arranged in a vertical position and is also suitable for bringing the pneumatic tire 4 into rotation around an axis of rotation 6 coinciding with the central axis of symmetry. Normally, the support device 5 comprises side rails (not illustrated) which hold the pneumatic tire 4 stable in the vertical position and comprises motorized rollers (illustrated schematically) whereupon the pneumatic tire 4 rests and is driven.

The application system 1 comprises a position sensor 7 which is suitable for determining the angular position of the pneumatic tire 4 around the axis 6 of rotation; the position sensor 7 may, for example, be an angular encoder coupled to one of the motorized rollers of the support device 5, or else the position sensor 7 may directly read the displacement of the pneumatic tire 4.

The application system 1 comprises a camera 8 which faces the outer surface of the pneumatic tire 4 at a side wall and is suitable for reading a graphical identification code (typically a bar code or similar) which is applied to the same side wall; in pneumatic tires 4, the graphical identification code is always applied in the same position (also in the same angular position), and, therefore, when the camera 8 detects the presence of the graphical identification code, the corresponding angular position is contextually determined of the pneumatic tire 4 around the axis 6 of rotation in order to obtain an absolute angular reference of the angular position of the pneumatic tire 4 around the axis 6 of rotation.

The application system 1 comprises an applicator unit 9 of the sealing agent 2 that deposits a strip of sealing agent 2 upon the inner surface 3 of the pneumatic tire 4. The applicator unit 9 comprises a dispensing head 10, wherefrom a strip of sealing agent 2 is dispensed that is deposited upon the inner surface 3 of the pneumatic tire 4, and a movement device 11 (for example, a robotic arm) which supports and moves the dispensing head 10: at the beginning and at the end of the application, the movement device 11 moves the dispensing head 10, respectively, inside the pneumatic tire 4 and outside the pneumatic tire 4, whilst, during the application, the movement device 11 moves the dispensing head 10 axially (i.e., parallel to the axis 6 of rotation) from one side of the pneumatic tire 4 to the opposite side of the pneumatic tire 4 in order to deposit upon the inner surface 3 a uniform layer of sealing agent 2 that covers the inner surface 3 itself.

According to a preferred embodiment, the movement device 11 holds the dispensing head 10 still during the application of the sealing agent 2 and axially only moves the dispensing head 10 between the end of the application of a strip of sealing agent and the beginning of the application of the next and adjacent strip of sealing agent; in other words, a plurality of circular strips of sealing agent 2 that are independent of each other and arranged side by side. According to an alternative embodiment, the movement device 11 axially and continuously moves the dispensing head 10 in order to deposit a single continuous strip (i.e., seamless) of sealing agent 2 having a helical shape.

Figure 2:
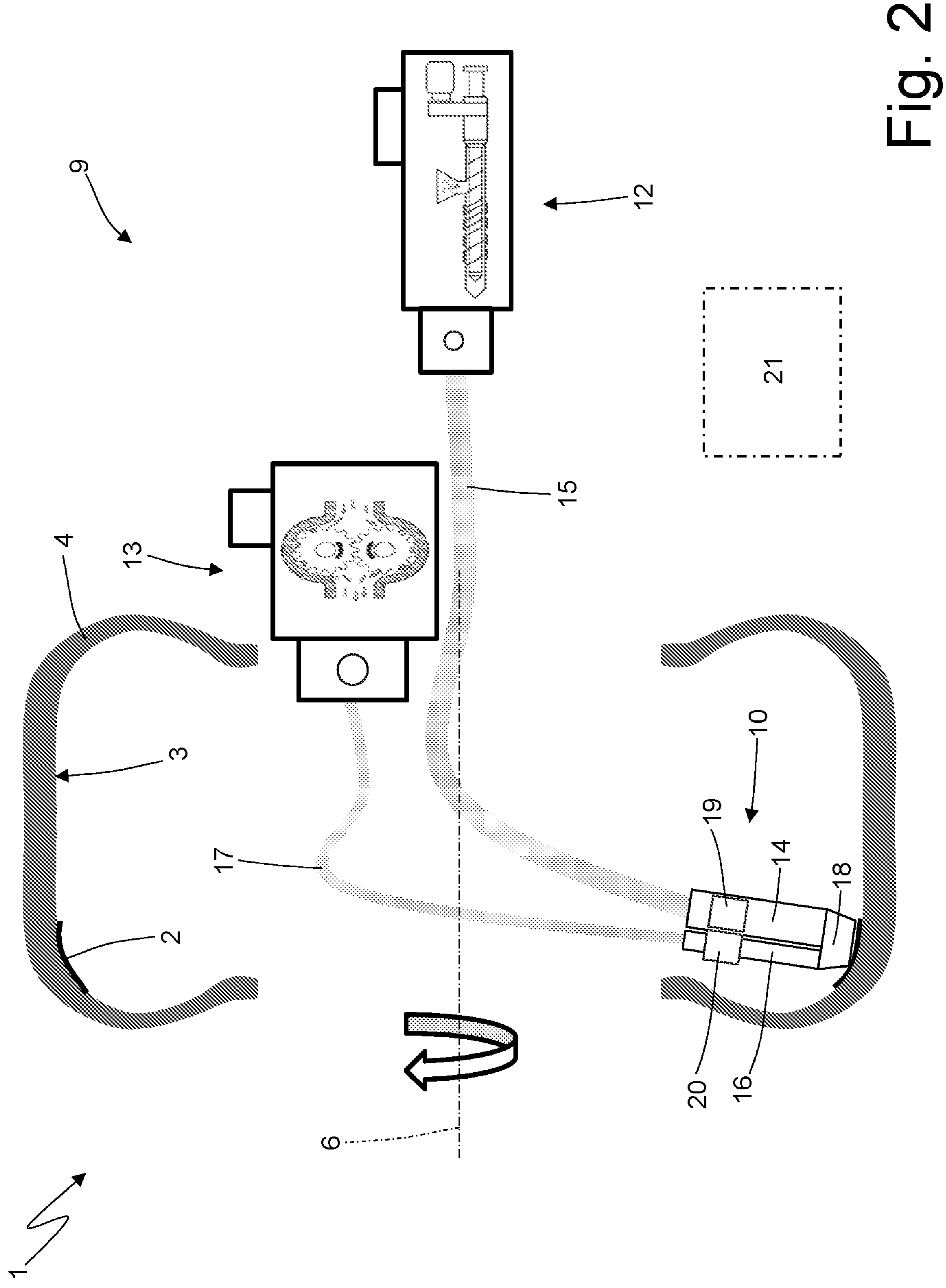
FIG. 2 is a schematic front view, with parts removed for clarity, of the application system of FIG. 1.

As illustrated in FIG. 2, the applicator unit 9 comprises a main extrusion device 12 and an additional extrusion device 13 which has a lower nominal sealing agent 2 flow rate compared to the main extrusion device 12 and lower dispensing inertia compared to the main extrusion device 12; in particular, the additional extrusion device 13 has lower dispensing inertia compared to the main extrusion device 12 due both to the reduced dimensions thereof and the different mode of pumping the sealing agent 2 as will be better described below.

The dispensing head 10 comprises a main tubular body 14 which receives the sealing agent 2 under pressure from the main extruder device 12 by means of a flexible pipe 15 and an additional tubular body 16 which receives the sealing agent 2 under pressure from the extrusion device 13 by means of a flexible pipe 17 (which is totally separate and independent from flexible pipe 15). Within the dispensing head 10, the end portions of the two tubular bodies 14 and 16 tubes are interconnected in such a way as to merge the respective throughputs of sealing agent 2; consequently, the dispensing head 10 comprises a single common outlet nozzle 18 which receives and dispenses a single throughput of sealing agent 2 (produced by the merging of the two throughputs of sealing agent 2 supplied by the two extrusion devices 12 and 13).

According to a preferred, but not binding, embodiment, the main extrusion device 12 comprises a worm screw that, in rotating around the longitudinal axis thereof, pumps the sealing agent 2 towards the dispensing head 10. According to a preferred, but not binding, embodiment, the additional extrusion device 13 comprises a gear pump (reversible) that pumps the sealing agent 2 towards the dispensing head 10.

A flow sensor 19 (mass) is provided that measures the flow rate $MF_{MAIN}$ (mass) of sealing agent 2 that is dispensed by the main extrusion device 12 (only) and that flows through the flexible pipe 15 and then through the main tubular body 14. In the embodiment illustrated in the attached figures, the flow sensor 19 is coupled to the main tubular body 14 upstream of the junction with the additional tubular body 16; in this way, the flow sensor 19 is able to measure the flow rate $MF_{MAIN}$ of sealing agent 2 that is dispensed only by the main extrusion device 12 at a point that is as close as possible to the outlet nozzle 18 (i.e., with the minimum possible delay with respect to the application of the sealing agent 2 to the inner surface 3 of the pneumatic tire 4).

Similarly, a flow sensor 20 (mass) is provided that measures the flow rate $MF_{ADD}$ (mass) of sealing agent 2 that is dispensed by the additional extrusion device 13 (only) and that flows through the flexible pipe 15 and then through the additional tubular body 16. In the embodiment illustrated in the attached figures, the flow sensor 20 is coupled to the additional tubular body 16 upstream of the junction with the main tubular body 14; in this way, the flow sensor 20 is able to measure the flow rate $MF_{ADD}$ of sealing agent 2 that is dispensed only by the additional extrusion device 13 at a point that is as close as possible to the outlet nozzle 18 (i.e., with the minimum possible delay with respect to the application of the sealing agent 2 to the inner surface 3 of the pneumatic tire 4).

The application system 1 comprises a control unit 21, which supervises the operation of the same application system 1 and, amongst other things, reads the flow sensors 19 and 20 and controls the activation and deactivation of the extrusion devices 12 and 13.

The operation of the applicator unit 9 is described with reference to the graph illustrated in FIG. 3.

Figure 3:
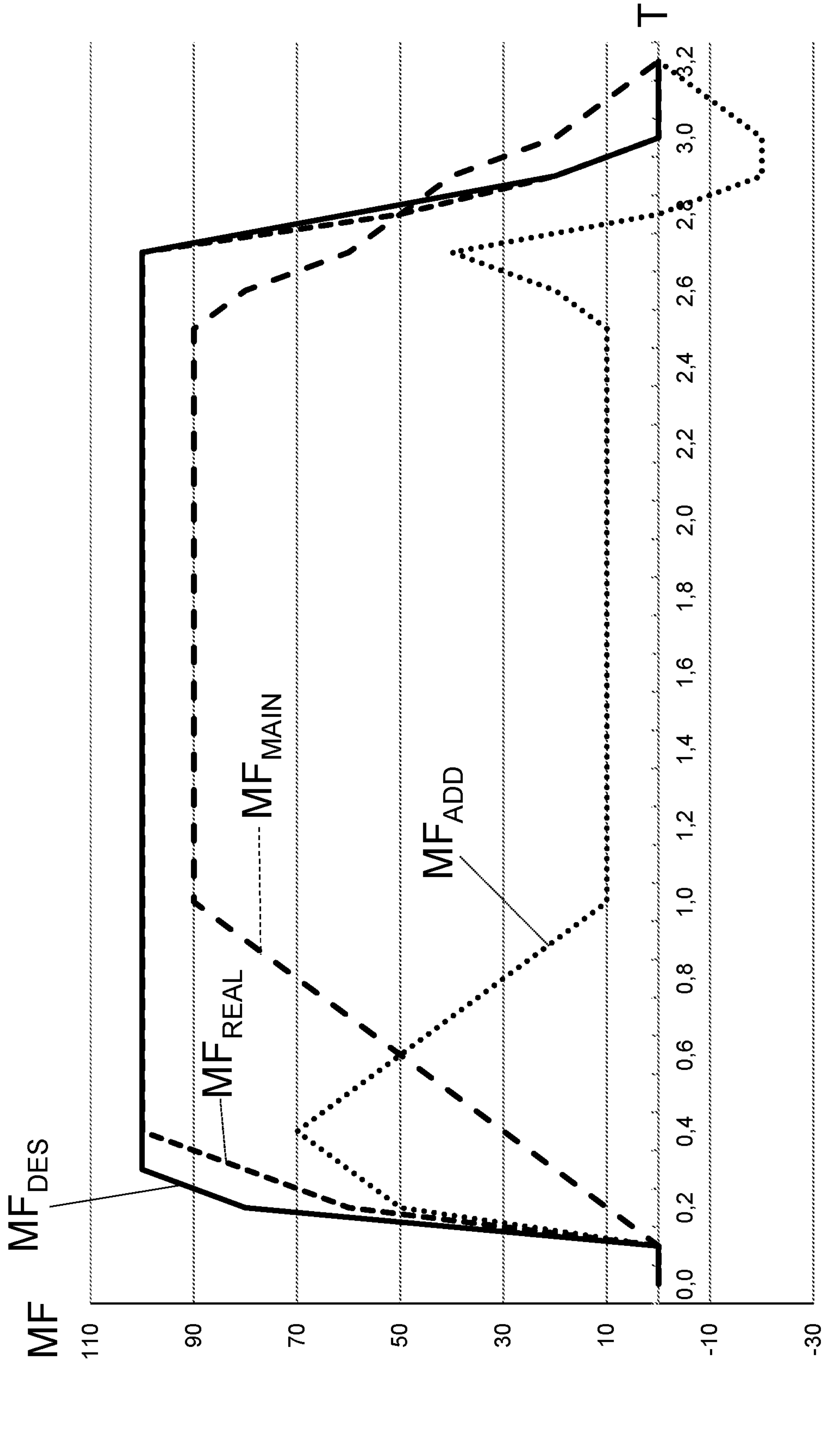
FIG. 3 is a graph showing the evolution over time of some flow rates of sealing agent dispensed during use by the application system of FIG. 1.

In FIG. 3: the continuous line illustrates the temporal evolution of the desired flow rate $MF_{DES}$ of sealing agent 2 which should be dispensed from the outlet nozzle 18, the coarse dotted line illustrates the temporal evolution of the flow rate $MF_{MAIN}$ of sealing agent 2 that is dispensed by the main extrusion device 12 only and that is measured by the flow sensor 20, the thinner dotted line illustrates the temporal evolution of the flow rate $MF_{ADD}$ of sealing agent 2 that is dispensed by the additional extrusion device 13 only and that is measured by the flow sensor 20, and the dashed line illustrates the temporal evolution of the actual (real) flow rate $MF_{REAL}$ of sealing agent 2 that is dispensed by the outlet nozzle 18 (the sum of the throughput $MF_{MAIN}$ of sealing agent 2 that is dispensed by the main extrusion device 12 and the throughput $MF_{ADD}$ of sealing agent 2 that is dispensed by the additional extrusion device 13).

When the dispensing of the sealing agent 2 begins from the outlet nozzle 18, the control unit 21 activates both of the extrusion devices 12 and 13 in order to attempt to follow, as faithfully as possible, the desired flow rate $MF_{DES}$ of sealing agent 2 (or in order to cancel the flow rate error equal to the difference between the desired flow rate $MF_{DES}$ of sealing agent 2 and the actual flow rate $MF_{REAL}$ of sealing agent 2): initially the flow rates $MF_{MAIN}$ and $MF_{ADD}$ of sealing agent 2 of both of the extrusion devices 12 and 13 are increased at the maximum rate possible (and of course the flow rate $MF_{ADD}$ of sealing agent 2 of the additional extrusion device 13 increases much more quickly than the flow rate $MF_{MAIN}$ of sealing agent 2 of the main extrusion device 12), while subsequently, when the actual flow rate $MF_{REAL}$ of sealing agent 2 reaches the desired flow rate $MF_{DES}$ of sealing agent 2, the flow rate $MF_{ADD}$ of sealing agent 2 of the additional extrusion device 13 is progressively decreased until it reaches a minimum non-zero value (i.e., the additional extrusion device 13 is extremely slowed but never stopped altogether).

In other words, at the beginning of the application of the sealant agent 2 to the inner surface 3 of the pneumatic tire 4, the ideal application profile (i.e., the desired flow rate $MF_{DES}$ of sealing agent 2) provides that the throughput of sealing agent 2 required is immediately available at the beginning of the application process, however, the inertia of the main extruder device 12 does not allow this (i.e., the flow rate $MF_{MAIN}$ of sealing agent 2 of the main extruder device 12 increases gradually, reaching, with a significant delay, the desired flow rate $MF_{DES}$ of sealing agent 2); during this step the additional extrusion device 13 is driven in such a way as to provide the sealing agent 2 that is missing due to the inertia of the main extrusion device 12. By virtue of this compensation performed by the additional extrusion device 13, the sealing agent 2 is dispensed from the outlet nozzle 18 with a steep ramp that corresponds to the desired flow rate $MF_{DES}$ of sealing agent 2 (i.e., to the ideal application profile).

When the dispensing of the sealing agent 2 from the outlet nozzle 18 ends, the control unit 21 stops the main extrusion device 12, the flow rate $MF_{MAIN}$ whereof of sealing agent 2 is made to continuously and rapidly decrease until it is zero and, at the same time, the control unit 21 drives the additional extrusion device 13 in order to follow the desired flow rate $MF_{DES}$ of sealing agent 2: during this step, the flow rate $MF_{ADD}$ of sealing agent 2 of the additional extrusion device 13 can increase (as initially occurs) or may even decrease until becoming negative (i.e., reversing the direction of advancement of the sealing agent 2). When the flow rate $MF_{ADD}$ of sealing agent 2 of the additional extrusion device 13 is positive, the sealing agent 2 is dispensed from the outlet nozzle 18 (i.e. the flow rate $MF_{ADD}$ of sealing agent 2 of the additional extrusion device 13 is added to the flow rate $MF_{MAIN}$ of sealing agent 2 of the main extrusion device 12), whilst, when the flow rate $MF_{ADD}$ of sealing agent 2 of the additional extrusion device 13 is negative, the sealing agent 2 enters the outlet nozzle 18 (i.e., the flow rate $MF_{ADD}$ of sealing agent 2 of the additional extrusion device 13 is subtracted from the flow rate $MF_{MAIN}$ of sealing agent 2 of the main extrusion device 12).

In other words, at the end of the application of sealing agent 2 to the inner surface 3 of the pneumatic tire 4, the ideal application profile provides that the throughput of sealing agent 2 stops immediately at the end of the formation of a strip, however, the inertia of the main extrusion device 12 does not allow this; during this step the additional extrusion device 13 is driven such as to dispense the missing sealing agent 2 or to remove the excess sealing agent 2 due to the inertia of the main extrusion device 12. By virtue of to this compensation, performed by the additional extrusion device 13, the dispensing of the sealing agent 2 from the outlet nozzle 18 is interrupted with a steep ramp that corresponds to the desired flow rate $MF_{DES}$ of sealing agent 2 (i.e., to the ideal application profile).

According to a possible embodiment, at the end of the application of the sealing agent 2 to the inner surface 3 of the pneumatic tire 4 the main extrusion device 12 is stopped in advance and the additional extrusion device 13 can be used both to add the missing sealing agent 2 (i.e., the flow rate $MF_{ADD}$ of sealing agent 2 of the additional extrusion device 13 is positive) and to remove the excess sealing agent 2 (i.e., the flow rate $MF_{ADD}$ of sealing agent 2 of the additional extrusion device 13 is negative).

Figure 4:
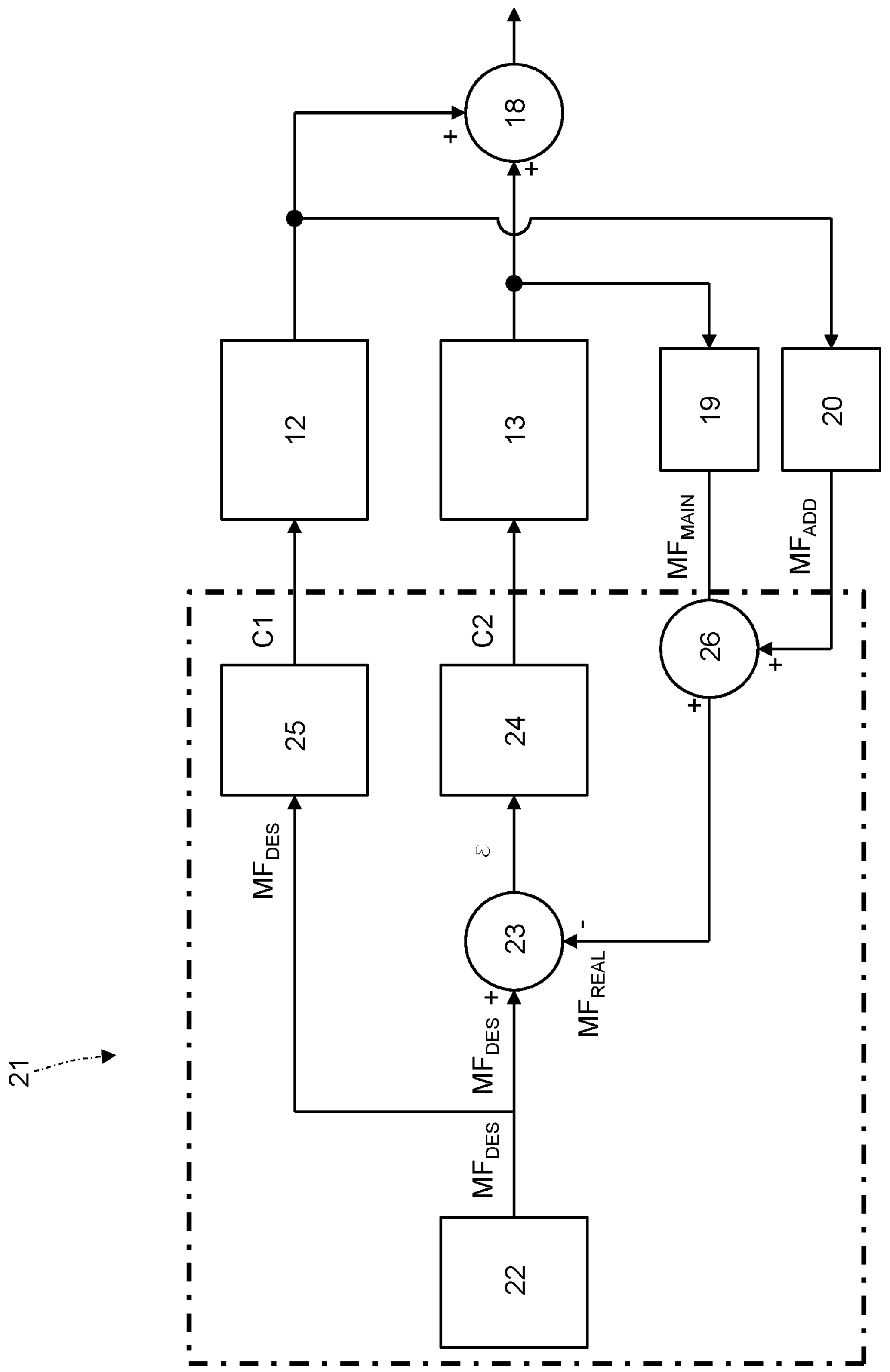
FIG. 4 is a block diagram which describes the control logic implemented within a control unit of the application system of FIG. 1.

According to a preferred embodiment illustrated in FIG. 4, the control unit 21 adjusts the flow rate $MF_{MAIN}$ of sealing agent 2 of the main extrusion device 12 in open-loop mode (i.e., without feedback) as a function of the desired flow rate $MF_{DES}$ of sealing agent 2 and, at the same time, the control unit 21 adjusts the flow rate $MF_{ADD}$ of sealing agent 2 of the additional extrusion device 13 in closed-loop mode (i.e., with feedback) in order to cancel the flow rate error, i.e. the difference between the desired flow rate $MF_{DES}$ of sealing agent 2 and the actual flow rate $MF_{REAL}$ of sealing agent 2. Consequently, the temporal progression of the flow rate $MF_{MAIN}$ of sealing agent 2 of the main extrusion device 12 is reasonably regular and faithfully follows (with a certain delay due to the high inertia of the main extrusion device 12) the progression of the desired flow rate $MF_{DES}$ of sealing agent 2, whilst the temporal progression of the flow rate $MF_{ADD}$ of sealing agent 2 of the additional extrusion device 13 is much more irregular (especially when starting and stopping) in order to compensate for the high inertia of the main extrusion device 12.

In the embodiment illustrated in FIG. 4, the control unit 19 comprises a processing block 22 which provides the desired flow rate $MF_{DES}$ of sealing agent 2, a subtraction block 23 which calculates the flow rate error ε in differentiating the difference between the desired flow rate $MF_{DES}$ of sealing agent 2 and actual flow rate $MF_{REAL}$ of sealing agent 2, and a control block 24 (typically a PID controller), which, as a function of the flow rate error ε, determines a control value C2 that is used to drive the additional extrusion device 13.

Furthermore, the control unit 19 comprises a control block 25 which, as a function of the desired flow rate $MF_{DES}$ of sealing agent 2, determines (in open-loop mode) a control value C1 that is used to drive the main extrusion device 12. Generally, the value C1 is determined in such a way as to ensure that the flow rate $MF_{MAIN}$ of sealing agent 2 of the main extrusion device 12 is always slightly less than the desired flow rate $MF_{DES}$ of sealing agent 2 (for example, equal to 90% of the desired flow rate $MF_{DES}$ of sealing agent 2) in such a way that the flow rate $MF_{ADD}$ of sealing agent 2 of the additional extrusion device 13 is never eliminated in a continuous manner, and therefore in such a way that the additional extrusion device 13 is never completely stopped. In fact, in always maintaining in motion (even although slowly) the additional extrusion device 13, the additional extrusion device 13 is more available in the case of a sudden requirement to rapidly vary the flow rate $MF_{ADD}$ thereof of sealing agent 2.

Finally, the control unit 19 comprises an addition block 26 that calculates the actual flow rate $MF_{REAL}$ of sealing agent 2 in adding the flow rate $MF_{MAIN}$ of sealing agent 2 of the main extrusion device 12 (as measured by the flow sensor 19) to the flow rate $MF_{ADD}$ of sealing agent 2 of the additional extrusion device 13 (as measured by the flow sensor 20).

According to a preferred embodiment, in controlling the extrusion devices 12 and 13, measurements are also used that are provided by the respective pressure sensors that determine the pressure of the sealing agent 2 within the same extrusion devices 12 and 13.

The embodiments described herein can be combined with each other without departing from the scope of protection of the present invention.

The application system 1 described above has many advantages.

First, the application system 1 described above allows for the very rapid beginning and ending of the dispensing of sealing agent 2 from the outlet nozzle 18 in compensating for the high inertia of the main extrusion device 12 by virtue of intervention of the additional extrusion device 13.

In other words, in order to overcome the inertia of the main extrusion device 12 during start-ups and shutdowns, the additional extrusion device 13, of a (relatively) reduced capacity and low inertia, intervenes when necessary; i.e., the application system 1 described above overcomes the limitations imposed by the high dispensing inertia of the main extrusion device 12 in coupling to the same main extrusion device 12 the additional extrusion device 13 having a (relatively) reduced capacity, high speed and low inertia.

The ability to rapidly start and stop the extrusion process (i.e., the dispensing of sealing agent 2 from the outlet nozzle 18) increases the flexibility of the application system 1 which is able to manufacture application models that can greatly enhance the uniformity of the layer of sealing agent 2 (and therefore the performance of the pneumatic tire 4, especially at high speed).

Furthermore, the application system 1 described above is simple and inexpensive to manufacture insofar as it requires the addition of only a few parts that are readily available commercially.

LIST OF REFERENCE NUMBERS IN THE FIGURES

1 application system
2 sealing agent
3 inner surface
4 pneumatic tire

The invention claimed is:

1. A system for applying a sealing agent to an inner surface of a pneumatic tire, the system comprising:

a support device configured to rotate the pneumatic tire around an axis of rotation;

a dispensing head configured for being arranged inside the pneumatic tire to apply a layer of the sealing agent to the inner surface of the pneumatic tire;

a main extrusion device connected to the dispensing head and configured to supply the dispensing head with a first throughput of the sealing agent;

an additional extrusion device connected to the dispensing head, wherein the additional extrusion device is separate and independent from the main extrusion device and is configured to supply the dispensing head with a second throughput of the sealing agent that merges with the first throughput of the sealing agent;

wherein the additional extrusion device has a nominal flow rate of the sealing agent and a dispensing inertia that are lower than a nominal flow rate of the sealing agent and a dispensing inertia of the main extrusion device;

a control unit, wherein the control unit governs the main extrusion device and the additional extrusion device in a coordinated manner such that the flow rate of the first throughput of the sealing agent and the flow rate of the second throughput of the sealing agent vary as a function of time and a sum of a flow rate of the first throughput of the sealing agent and a flow rate of the second throughput of the sealing agent is equal moment by moment to a target flow rate of the sealing agent; and wherein, when the dispensing of the sealing agent from the dispensing head begins, the control unit:

initially increases the respective flow rates of the sealing agent of the main extrusion device and the additional extrusion device at a maximum rate possible until the sum of the flow rate of the first throughput of the sealing agent and the flow rate of the second throughput of the sealing agent equals the target flow rate; and subsequently, when the sum of the flow rate of the first throughput of the sealing agent and the flow rate of the second throughput reaches the target flow rate of the sealing agent, the flow rate of the sealing agent of the additional extrusion device is progressively decreased until it reaches a minimum non-zero value and the flow rate of the second throughput of the sealing agent is increased by a corresponding amount such that the sum of the flow rate of the first throughput of the sealing agent and the flow rate of the second throughput equals the target flow rate remains constant.

2. The system of claim 1, wherein the dispensing head comprises a single common outlet nozzle wherefrom a single throughput of the sealing agent emerges formed from the merging of the first throughput of the sealing agent with the second throughput of the sealing agent.

3. The system of claim 1, wherein:

the dispensing head comprises a main tubular body which receives the sealing agent under pressure from the main extrusion device via a first pipe, and an additional tubular body which receives the sealing agent under pressure from the additional extrusion device via a second pipe; and respective end parts of the two tubular bodies are interconnected to merge together the respective throughputs of the sealing agent.

4. The system of claim 1, wherein the additional extrusion device comprises a gear pump that pumps the sealing agent towards the dispensing head.

5. The system of claim 1, comprising:
a first flow sensor that measures a flow rate of the first throughput of the sealing agent that is dispensed by the main extrusion device; and
a second flow sensor that measures the flow rate of the second throughput of the sealing agent that is dispensed by the additional extrusion device.

6. The system of claim 1, wherein the control unit is configured to drive the additional extrusion device to supply sealing agent that is missing in relation to the desired flow rate of the sealing agent.

7. The system of claim 1, wherein, when the dispensing of the sealing agent from the dispensing head ends, the control unit is configured to stop the main extrusion device in advance and to drive the additional extrusion device in order to add missing sealing agent or in order to remove excess sealing agent.

8. The system of claim 1, wherein the control unit is configured to:
drive the flow rate of the first throughput of the sealing agent of the main extrusion device in open-loop mode as a function of the desired flow rate of the sealing agent, and
at the same time, to drive the flow rate of the second throughput of the sealing agent of the additional extrusion device in closed-loop mode in order to cancel a flow rate error comprising the difference between the desired flow rate of the sealing agent and an actual flow rate of the sealing agent.

9. The system of claim 1, wherein the control unit is configured to drive the main extrusion device in such a way that the flow rate of the first throughput of the sealing agent is always less than the desired flow rate of the sealing agent, wherein flow rate of the second throughput of the sealing agent is never canceled in a continuous manner, and wherein the additional extrusion device is never completely stopped.

* * * * *